United States Patent
Campbell

[19]

[11] Patent Number: 5,884,818
[45] Date of Patent: Mar. 23, 1999

[54] GREASE GUN

[76] Inventor: Norman Campbell, Box 56, Atmore, Alberta, Canada, T0A 0E0

[21] Appl. No.: 803,823

[22] Filed: Feb. 24, 1997

[51] Int. Cl.$^6$ ..................................................... G01F 11/00
[52] U.S. Cl. ........................................... 222/256; 222/340
[58] Field of Search ..................................... 222/256, 391, 222/340, 326, 327, 529; 184/45.1, 48.1

[56] References Cited

U.S. PATENT DOCUMENTS

| | | | |
|---|---|---|---|
| 2,394,488 | 2/1946 | Rotter et al. | 222/340 |
| 3,038,768 | 6/1962 | Kludt | 222/256 |
| 4,298,144 | 11/1981 | Pressi | 222/256 |
| 5,323,934 | 6/1994 | Isert | 222/326 |
| 5,404,967 | 4/1995 | Barry | 184/105.2 |

FOREIGN PATENT DOCUMENTS

| | | | |
|---|---|---|---|
| 512843 | 5/1955 | Canada | 222/256 |
| 837942 | 3/1970 | Canada | 222/391 |

*Primary Examiner*—Philippe Derakshani
*Attorney, Agent, or Firm*—Anthony R. Lambert

[57] ABSTRACT

A grease gun includes a tubular casing having a first end, a second end, and an interior cavity defined by interior sidewalls. A pump mechanism is positioned at the first end of the casing. A piston is disposed in the interior cavity in sliding contact with the interior sidewalls. A shaft is provided having a first end secured to the piston and a second end that extends past the second end of the casing. A ratchet mechanism is positioned at the second end of the casing which engages and imparts axial movement to the shaft to move the piston toward the first end of the casing. The ratchet mechanism applies sufficient pressure to force entrapped air from the grease gun.

1 Claim, 5 Drawing Sheets

GREASE GUN

FIELD OF THE INVENTION

The present invention relates to a grease gun.

BACKGROUND OF THE INVENTION

A problem frequently encountered with grease guns is the entrapment of air in the grease. This entrapped air adversely effects the operation of the grease gun. The patent literature has numerous references to the problem, and a variety of solutions have been proposed.

U.S. Pat. No. 4,298,144 which issued to Pressi in 1981 discloses a grease gun having a tubular casing with a threaded attachment cap. The inner thread of the attachment cap is cut away along a groove running in an axial direction. The groove serves as an air outlet, so that air can escape from the tubular casing through the groove when the attachment cap is not entirely screwed onto the tubular casing. When an air lock is experienced due to entrapped air, the attachment cap is loosened so that continued application of pressure to expel grease expels the unwanted air. The air outlet is made considerably smaller than the grease outlet so that during the expulsion of air as little grease as possible is expelled.

U.S. Pat. No. 5,404,967 which issued to Barry in 1995 discloses a grease gun that has two passageways in which are positioned pistons. The two passageways share a common outlet controlled by a ball valve. The pistons are mounted on a common piston mounting block and, consequently, move in unison. As the pistons move forward in unison, they push a predetermined quantity of grease through the common outlet. If air enters one of the two passageways, grease will continue to pass through the other of the two passageways to the common outlet, causing the ball valve to open and releasing the air lock.

The solution proposed by Pressi is workable and has come into commercial usage. When the grease gun user loosens the attachment cap to open the air passage, care must be taken not to loosen the attachment cap too much. If the attachment cap is too loose it will "pop" off the tubular casing when pressure is applied. When air bleeds off through the air passage, a quantity of grease often follows the air through the air passage making an unwanted mess.

The solution proposed by Barry is a complex and expensive solution to a relatively simple problem. Insufficient time has passed to determine whether the solution proposed by Barry will gain commercial acceptance.

SUMMARY OF THE INVENTION

What is required is an alternative solution to the problem of air entrapment in a grease gun.

According to the present invention there is provided a grease gun including a tubular casing having a first end, a second end, and an interior cavity defined by interior sidewalls. Pump means are positioned at the first end of the casing, whereby grease is pumped from the interior cavity. A piston is disposed in the interior cavity in sliding contact with the interior sidewalls. A shaft is provided having a first end and a second end. The first end of the shaft is secured to the piston. The second end of the shaft extends past the second end of the tubular casing. A ratchet mechanism is positioned at the second end of the casing. The ratchet mechanism engages and imparts axial movement to the shaft to move the piston toward the first end of the casing.

When an air lock is experienced due to entrapped air, with the grease gun as described above, the ratchet mechanism is used to supply sufficient pressure to force the air out of the grease and overcome the "air lock". This simple, and yet effective, solution can be implemented with very little structural change required to the grease gun.

Although beneficial results may be obtained through the use of the grease gun, as described above, the ratchet mechanism is only required when entrapped air interferes with the normal operation of the grease gun. It is, therefore, preferred that the ratchet mechanism have an operative mode and an inoperative mode.

Although beneficial results may be obtained through the use of the invention, as described above, even when the ratchet mechanism is in the inoperative mode it is desirable to have the piston exert a force upon grease in the interior cavity to urge the grease toward the first end of the casing. Even more beneficial results may, therefore, be obtained when means is provided for detachably securing the piston to the first end of the shaft. The piston, once detached, slides axially along the shaft. A biasing spring is disposed between the second end of the casing and the piston to urge the piston toward the first end of the shaft, thereby urging grease within the interior cavity toward the first end of the casing.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
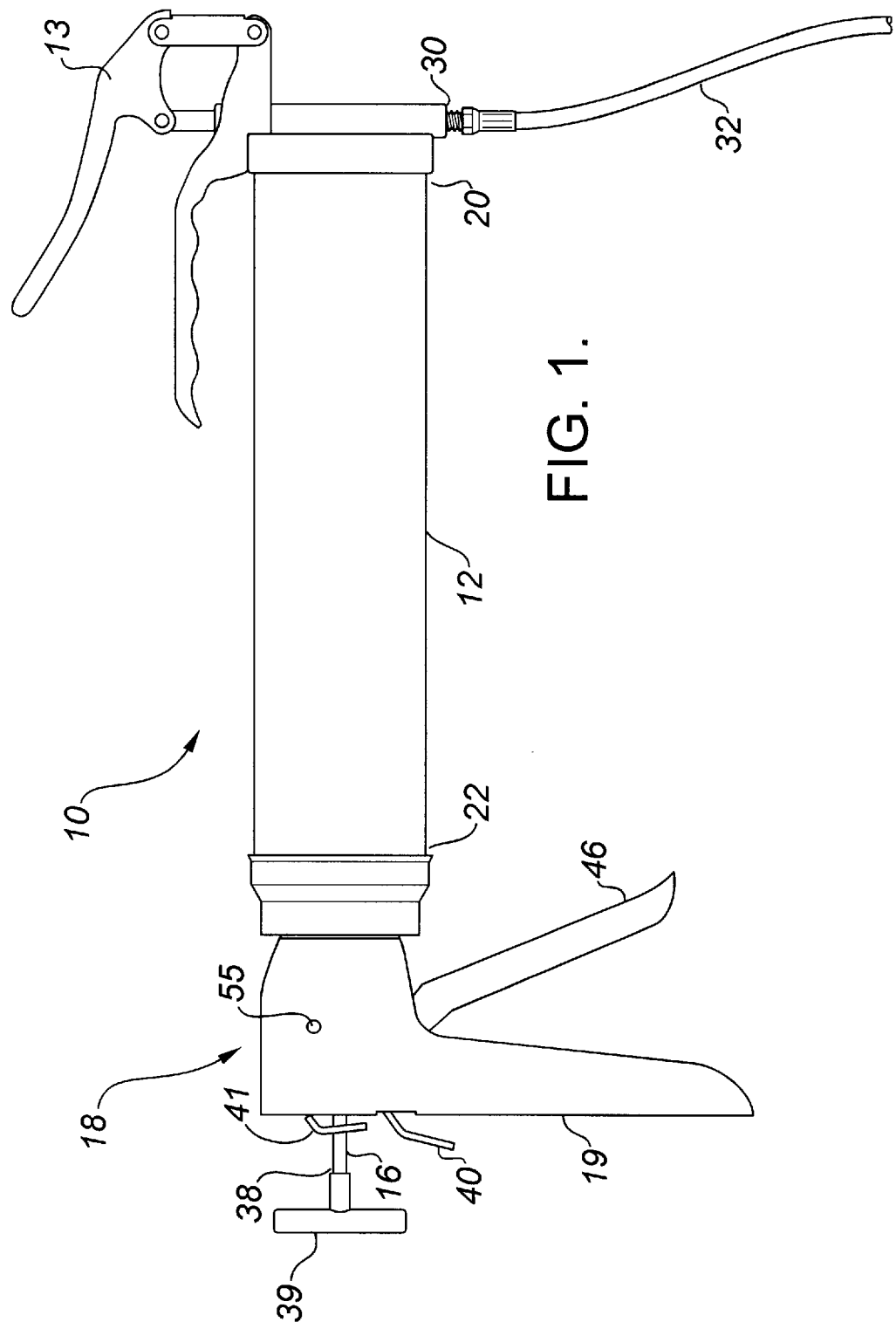
FIG. 1 is a side elevation view of a grease gun constructed in accordance with the teachings of the present invention.

The preferred embodiment, a grease gun generally identified by reference numeral 10, will now be described with reference to FIGS. 1 through 6.

Figure 2:
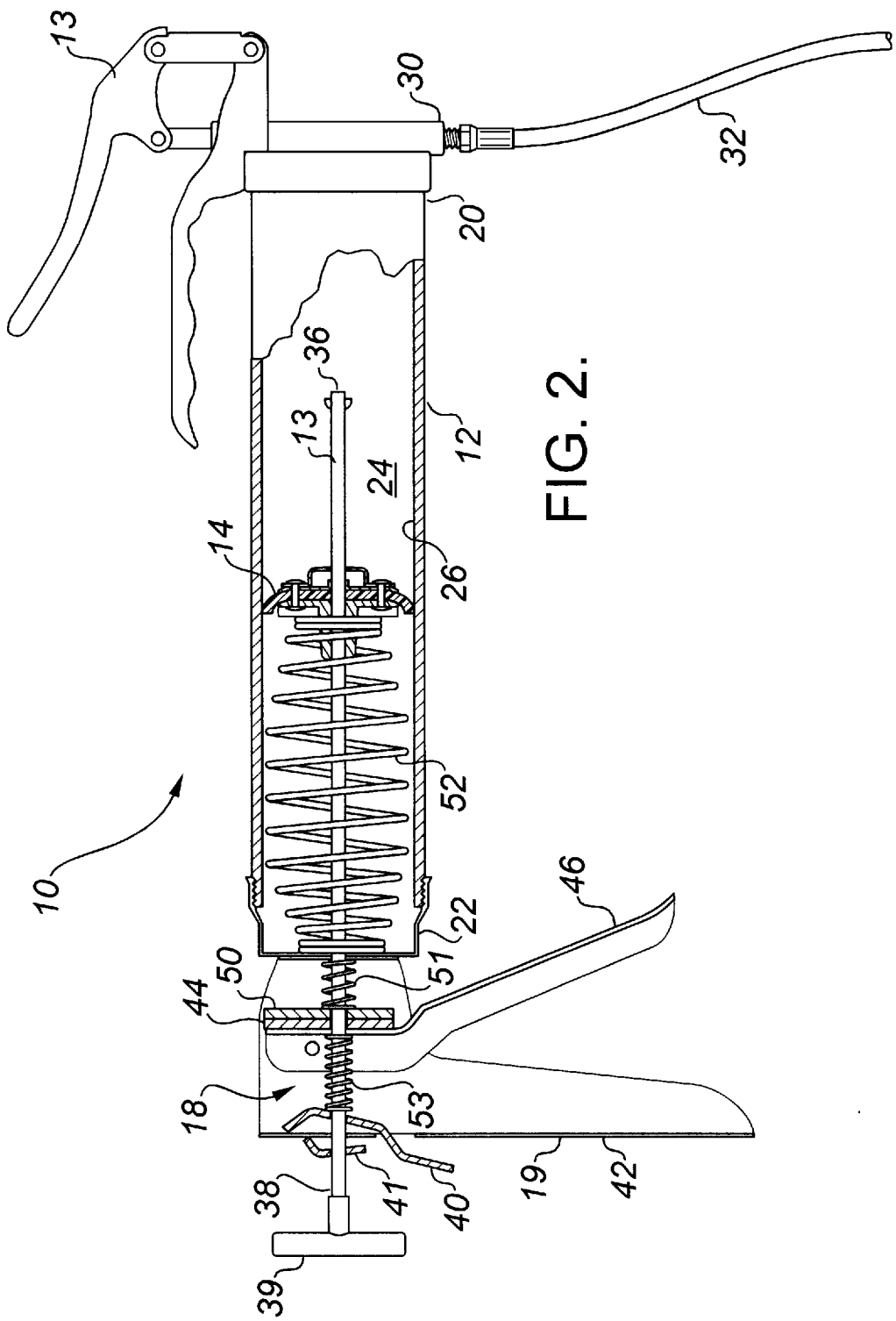
FIG. 2 is a side elevation view, in section, of the grease gun illustrated in FIG. 1, with the piston floating on the shaft.
Figure 3:
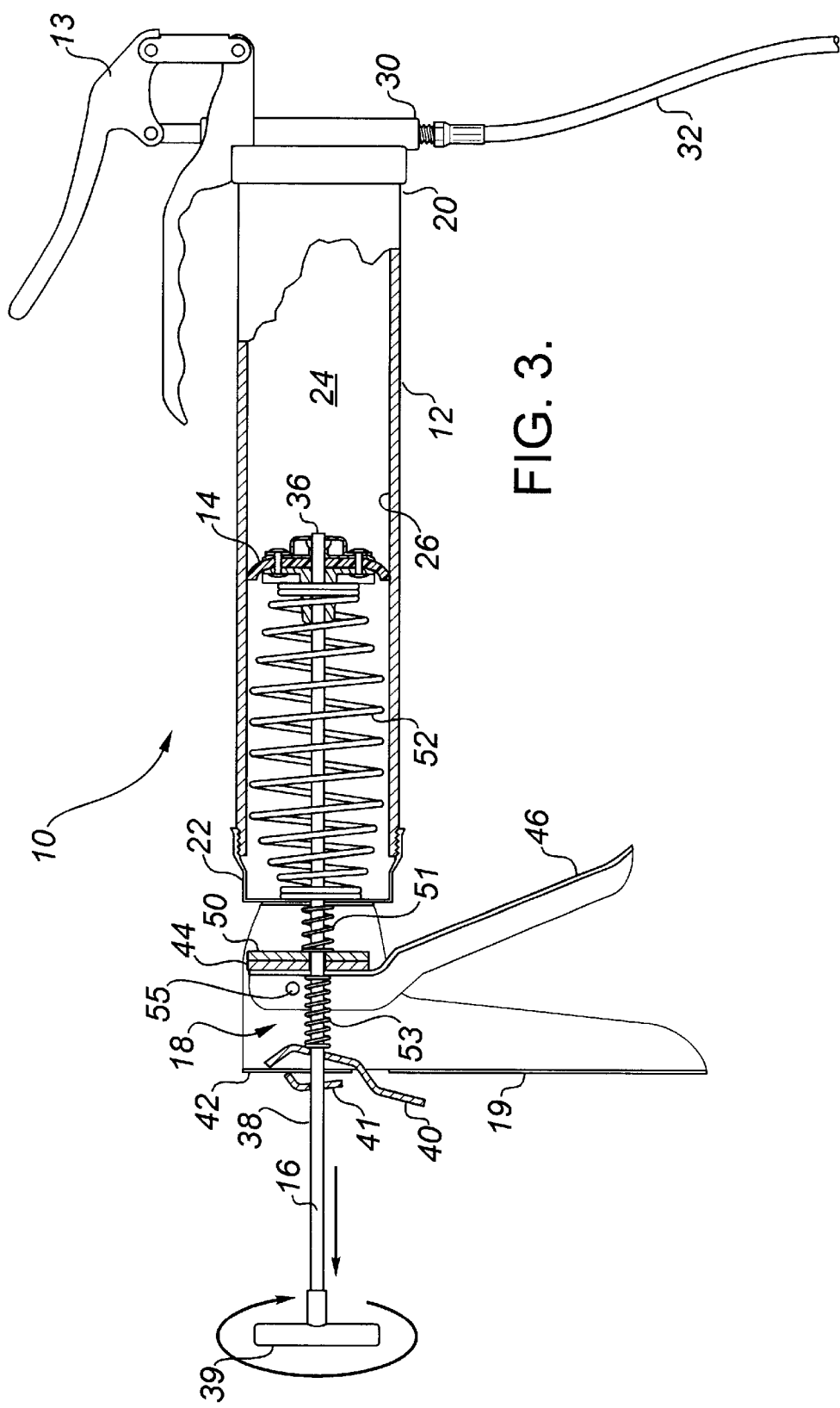
FIG. 3 is a side elevation view, in section, of the grease gun illustrated in FIG. 1, with the shaft drawn back to until the first end of the shaft engages the piston.
Figure 4:
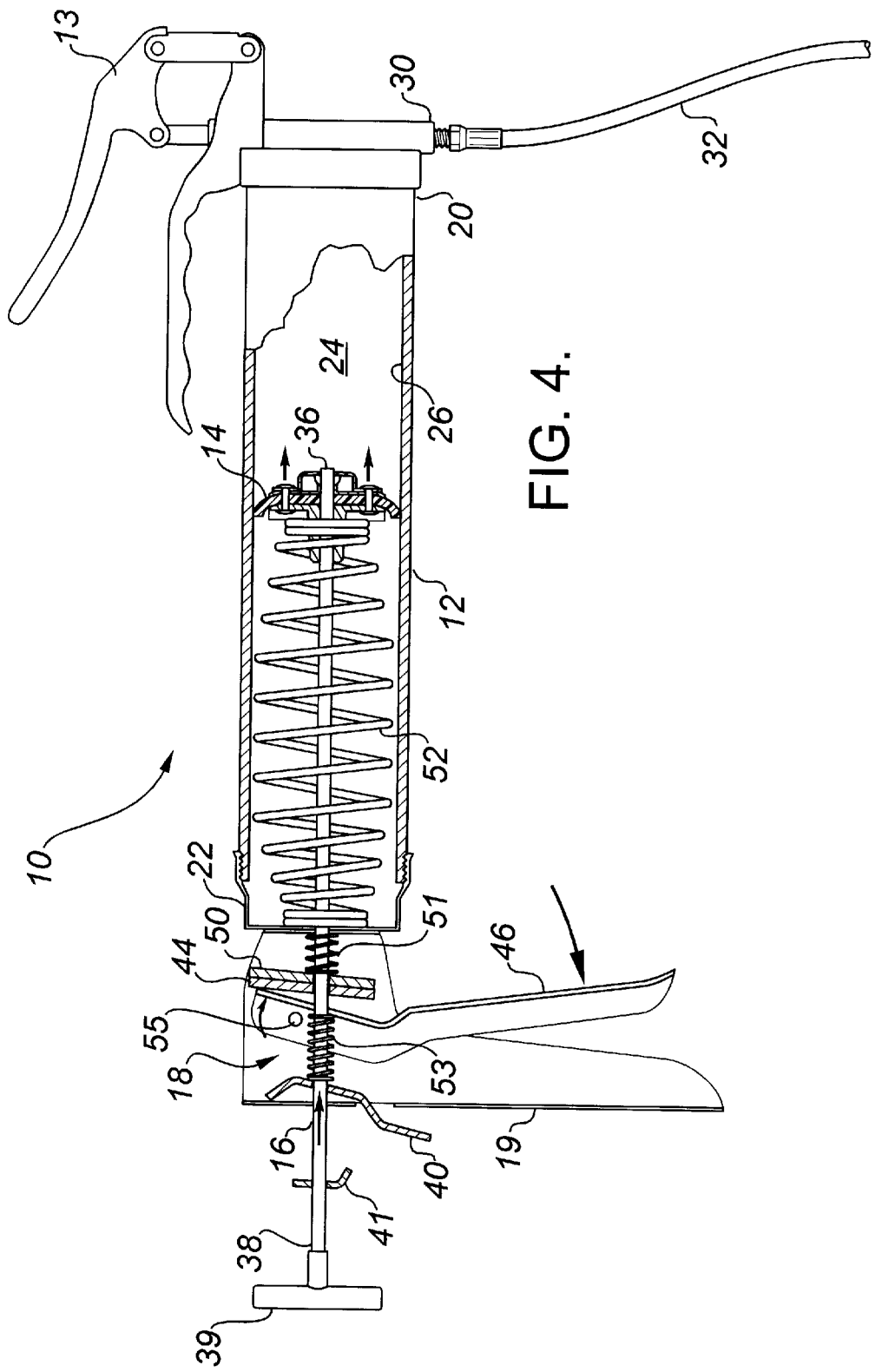
FIG. 4 is a side elevation view, in section, of the grease gun illustrated in FIG. 1, with the piston locked to the first end of the shaft.
Figure 5:
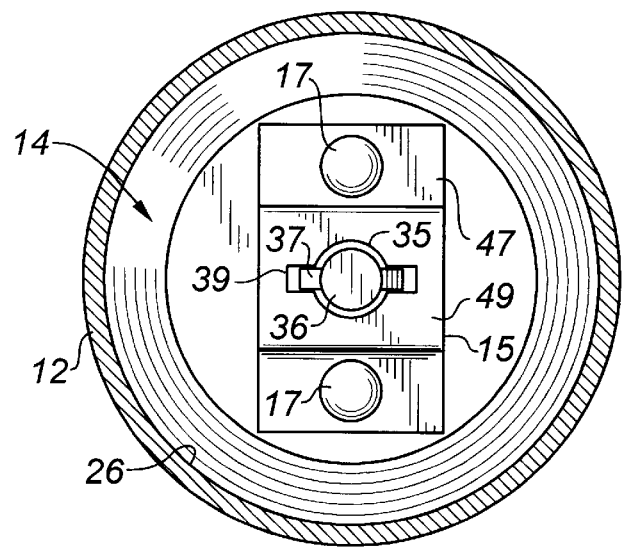
FIG. 5 is a detailed end elevation view, in section, of the grease gun illustrated in FIG. 4.
Figure 6:
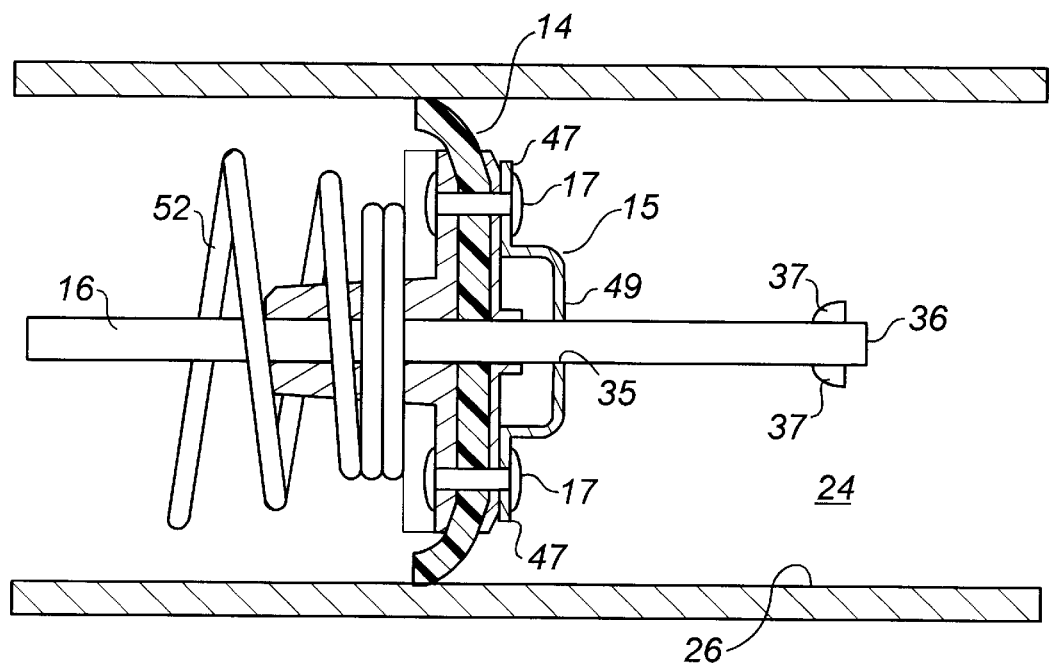
FIG. 6 is a detailed side elevation view, in section, of the grease gun illustrated in FIG. 2.

Referring to FIG. 1, the primary components of grease gun 10 include a tubular casing 12, a pump mechanism 13, a piston 14, a shaft 16 and a ratchet mechanism 18. Casing 12 has a first end 20 and a second end 22. Referring to FIGS. 2 through 4, an interior cavity 24 extends between first end 20 and second end 22 of casing 12 as defined by interior sidewalls 26. Referring to FIG. 1, pump mechanism 13 is secured to first end 20 of casing 12. Pump mechanism 13 has an associated grease outlet 30 through which grease is pumped from interior cavity 24. A hose 32 is attached to grease outlet 30, so that grease may be directed as required. Referring to FIGS. 2 through 4, piston 14 is disposed within interior cavity 24 in sliding contact with interior sidewalls 26. Shaft 16 has a first end 36 and a second end 38. First end 36 of shaft 16 is concentrically disposed within interior cavity 24 of casing 12. Second end 38 of shaft 16 extends past second end 22 of tubular casing 12. Referring to FIG. 2, piston 14 is mounted on shaft 16 and slides axially along shaft 16. A biasing spring 52 is disposed between second end 22 of casing 12 and piston 14. Spring 52 provides a biasing force which urges piston 14 toward first end 36 of shaft 16, thereby urging grease within interior cavity 24 toward first end 20 of casing 12. Referring to FIGS. 3 through 6, means is provided for detachably securing piston 14 to first end 36 of shaft 16. Referring to FIG. 5, a locking housing 15 is secured to piston 14 by means of rivets 17. Locking housing 15 is integrally formed with two flat co-planar wing portions 47 and a raised central portion 49. Raised central portion 49 has a key hole-like slotted opening 35. Referring to FIG. 6, first end 36 of shaft 16 has opposed appendages 37. Referring to FIG. 3, in order to lock piston 14 to first end 36 of shaft 16, a force is exerted upon handle 39 at second end 38 of shaft 16 in order to bring first end 36 of shaft 16 into engagement with piston 14. Opposed appendages 37 at first end 36 of shaft 16 are brought into register with slotted opening 35 in locking housing 15. Shaft 16 is then rotated to place opposed appendages 37 out of register with slotted opening 35, thereby trapping first end 36 of shaft 16 within locking housing 15. Referring to FIG. 4, when locked in the manner described, piston 14 moves with shaft 16. Ratchet mechanism 18 is positioned at second end 22 of casing 12. A lever 40 is provided in order to place ratchet mechanism in either an operative mode or an inoperative mode. In the operative mode, illustrated in FIG. 4, ratchet mechanism 18 engages and imparts axial movement to shaft 16 to move piston 14 toward first end 20 of casing 12. Ratchet mechanism 18 has a pistol style housing 42 with a hand grip 19. A ratchet plate 44 is housed within pistol style housing 42. Ratchet plate 44 is sandwiched between a trigger lever 46 and a holding plate 50. Trigger lever 46, ratchet plate 44, and holding plate 50 are held in close contact by springs 51 and 53. Ratchet plate 44 and holding plate 50 are jammed at an angle on shaft 16; gripping shaft 16 in a similar fashion to a holding mechanism for a screen door. Referring to FIG. 4, trigger lever 46 can be used to move ratchet plate 44 and holding plate 50 along shaft 16. Trigger lever 46 pivots about pivot axis 55. Referring to FIG. 3, a holding plate 41 is provided to hold shaft 16 in an extended position with second end 38 of shaft 16 extending from second end 22 of casing 12.

The use and operation of grease gun 10 will now be described with reference to FIGS. 1 through 6. Referring to FIG. 3, When filling interior cavity 24 of grease gun 10 with grease, shaft 16 is grasped by handle 39 in order to draw second end 38 of shaft 16 as far as possible out of interior cavity 24 of casing 12. This moves piston 14 towards second end 22 of casing 12. Holding plate 41 is used to temporarily hold shaft 16 in the extended position described, while interior cavity 24 of grease gun 10 is filled with grease. Referring to FIG. 2, as soon as grease gun 10 has been filled with grease, holding plate 41 is moved out of the way and shaft 16 inserted back into interior cavity 24 of casing 12. In normal operation, piston 14 is slides axially along shaft 16. Spring 52 provides a biasing force which urges piston 14 toward first end 36 of shaft 16, thereby urging grease within interior cavity 24 toward first end 20 of casing 12. Pump mechanism 13 is manipulated as required to expel grease out through grease outlet 30 into hose 32. In the absence of an air lock, spring 52 will provide a sufficient biasing force to maintain the desired flow of grease. Referring to FIG. 3, should a condition of "air lock" be encountered, a force is exerted upon handle 39 at second end 38 of shaft 16 in order to bring first end 36 of shaft 16 into engagement with piston 14. Referring to FIG. 5, opposed appendages 37 at first end 36 of shaft 16 are brought into register with slotted opening 35 in locking housing 15. Referring to FIG. 3, shaft 16 is then rotated to place opposed appendages 37 out of register with slotted opening 35, thereby trapping first end 36 of shaft 16 within locking housing 15. Lever 40 is placed in a position in which ratchet mechanism 18 is in an operative mode. Referring to FIG. 4, by manipulating trigger lever 46 of ratchet mechanism 18, piston 14 is urged toward first end 20 of casing 12 with such force that entrapped air is expelled through grease outlet 30. Referring to FIG. 3, once the entrapped air is expelled, shaft 16 is rotated in order to return piston to the position illustrated in FIG. 2. Lever 40 is then placed in a position in which ratchet mechanism 18 is inoperative. The pumping of grease is then resumed using pump mechanism 13 with the only force upon piston 14 being exerted by spring 52.

It will be apparent to one skilled in the art that modifications may be made to the illustrated embodiment without departing from the spirit and scope of the invention as hereinafter defined in the claims.

The embodiments of the invention in which an exclusive property or privilege claimed are defined as follows:

1. A grease gun, comprising:

a tubular casing having a first end, a second end, an interior cavity defined by interior sidewalls;

pump means at the first end of the casing, whereby grease is pumped from the interior cavity;

a shaft having a first end and a second end, the first end of the shaft being concentrically disposed within the interior cavity of the casing, the second end of the shaft extending past the second end of the tubular casing;

a piston disposed in the interior cavity, the piston being mounted onto the first end of the shaft in sliding contact with the interior sidewalls;

a ratchet mechanism positioned at the second end of the casing, the ratchet mechanism having an operative and an inoperative mode, in the operative mode the ratchet mechanism engaging and imparting axial movement to the shaft to move the piston toward the first end of the casing; and means for detaching the piston from the first end of the shaft when the ratchet mechanism is in the inoperative mode such that the piston slides axially along the shaft, a biasing spring being disposed between the second end of the casing and the piston, the spring providing a biasing force between the casting and the piston to urge the piston toward the first end of the shaft regardless of whether the piston is attached to the shaft, thereby urging grease within the interior cavity toward the first end of the casing.

* * * * *